Nov. 22, 1960 — R. F. BOYLE ET AL — 2,960,970
SERVO FLUID MOTOR

Filed Aug. 27, 1957 — 3 Sheets-Sheet 1

*INVENTOR.*
ROBERT F. BOYLE
BY RICHARD J. LAPPIN

ATTORNEY

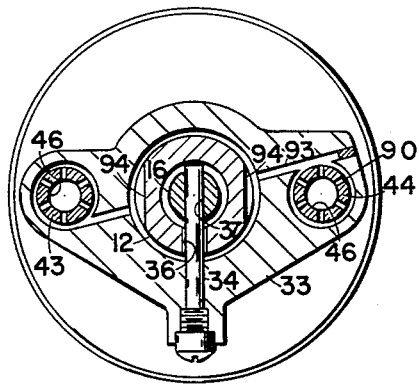
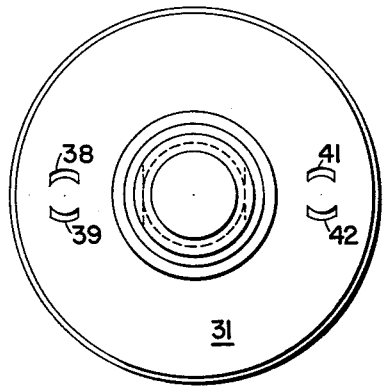
FIG. 5  FIG. 6
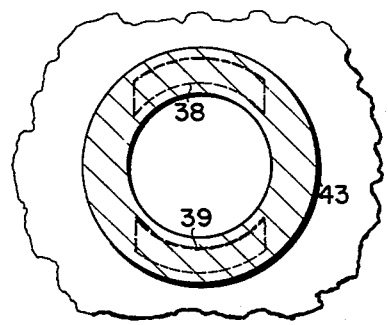
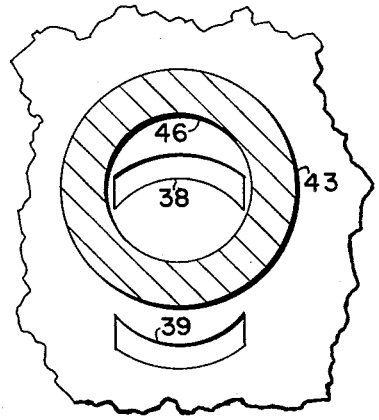
FIG. 7a  FIG. 7b
INVENTOR.
ROBERT F. BOYLE
BY RICHARD J. LAPPIN
ATTORNEY

2,960,970

Patented Nov. 22, 1960

2,960,970

SERVO FLUID MOTOR

Robert F. Boyle, Kalamazoo, and Richard J. Lappin, Muskegon, Mich., assignors to Cleveland Pneumatic Industries, Inc., a corporation of Ohio Filed Aug. 27, 1957, Ser. No. 680,484

7 Claims. (Cl. 121—41)

This invention relates to servo-fluid motors and more particularly to a fluid motor and controls therefor which duplicates the motion of a low torque input signal at a substantially higher torque value.

The fluid motor according to this invention was designed primarily for use in conjunction with an aircraft to provide power operation of the aircraft throttle and will be discussed in connection with this particular application. However, it should be understood that a device of this nature could be used to produce rotary motion with substantial torques for any application wherein the input torque signals to control the motor have relatively low energy values. In some cases, the movement of the fuel control arm and aircraft engine required a manual effort in the order of 60 inch pounds. With the use of a servo-fluid motor according to this invention the manual effort to operate the fuel control arm is in the order of 5 inch pounds. In addition, the fluid motor fixes the position of the control arm against movement due to vibrations until further movement is initiated by the pilot. In order to simplify the hydraulic problem the unit is operable by the aircraft fuel under pressure supplied by the aircraft fuel pumps and, therefore, does not require a separate source of fluid under pressure.

It is an important object of this invention to provide a rotary fluid motor and control valve mechanism suitable for use in producing high torque rotary motion in response to a low torque control signal.

It is another important object of this invention to provide a servo-fluid motor which accurately reproduces an input motion at a substantially higher force value.

It is still another object of this invention to provide a fluid motor in combination with control means, therefore, which is adapted to be operated by a source of fluid under pressure wherein the pressure of the source can vary over wide pressure ranges.

It is still another object of this invention to provide a new and improved pressure fluid control system in combination with a fluid motor.

It is still another object of this invention to provide a servo-fluid motor particularly suited for the power operation of aircraft throttles or the like.

Further objects and advantages will appear from the following description and drawings, wherein:

Figure 5 is a fragmentary cross-sectional view of the motor control valve structure;

Figure 6 is a view of the lower plate of the fluid motor showing the valve porting, and;

Figures 7a and 7b are enlarged fragmentary views showing the control valve in the off position and operating position respectively.

Figure 1:
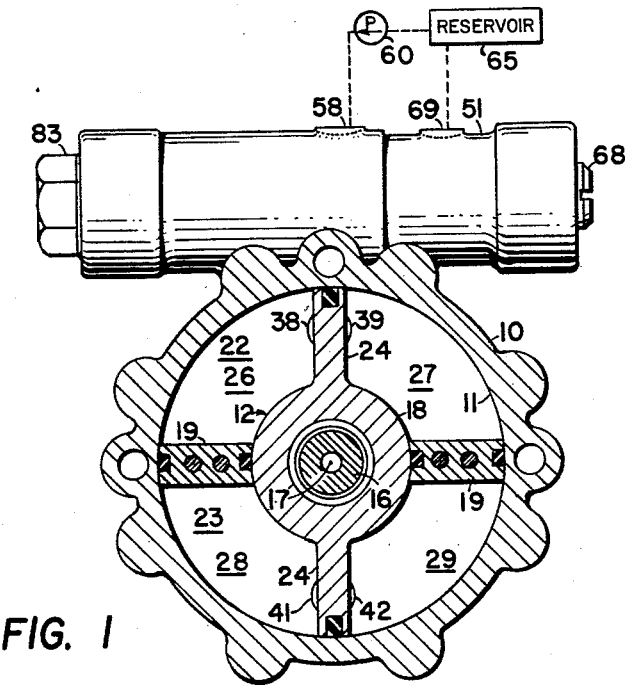
Figure 1 is a plan view partially in cross section of the vane type fluid motor of the servo-system.

The fluid motor and servo mechanism is contained within a housing 10 formed with an axial bore 11 in which is positioned rotor 12. A cover member 13 closes the upper end of the bore 11 and is provided with a central aperture 14 through which a signal input member 16 projects. The rotor 12 is journaled within the housing 10 and cover 13 for rotation about a central axis 17 and is formed with a cylindrical hub 18. A cross plate 31 divides the bore 11 into an upper motor zone 31a and a lower valve zone 31b. A pair of opposed fixed vanes 19 are mounted on the cover 13 by pins 21 and extend into the motor zone 31a laterally between the wall of the bore 11 and the hub 18 and vertically between the cover member 13 and cross plate 31 thus dividing the motor zone into similar fluid chambers 22 and 23. The rotor 12 is also formed with integral vanes 24 which rotate with the rotor and extend between the hub 18 and the wall of the bore 11. These vanes divide the fluid chambers 22 and 23 into variable volume compartments 26, 27, 28, and 29 respectively. It should be understood that the two compartments 26 and 27 combine to form the chamber 22 and that the two compartments 28 and 29 combine to form the chamber 23. The volume of the two chambers 22 and 23 remains constant but the volumes of the compartments 26 through 29 vary as the rotor 12 is rotated around the axis 17. Because the device is symmetrical the two compartments 27 and 28 are always the same size and the two compartments 26 and 29 are always the same size. Suitable seal means are provided on the vanes 19 and 24 to isolate the various compartments 26 through 29.

If fluid under pressure is introduced into the compartments 27 and 28 and the compartments 26 and 29 are connected to a reservoir return or the outlet, a force is developed on the rotor urging it in a counter-clockwise direction in Fig. 1. Conversely the fluid under pressure is introduced into the compartments 26 and 29 while the compartments 27 and 28 are connected to a reservoir return a force is developed on the rotor 12 urging it in the clockwise direction. The fluid motor itself is only contained in the zone 31a above the cross plate 31 leaving the zone 31b between the cross plate 31 and an end wall 32 of the bore 11 for the servo or control valve mechanism.

Figure 4:
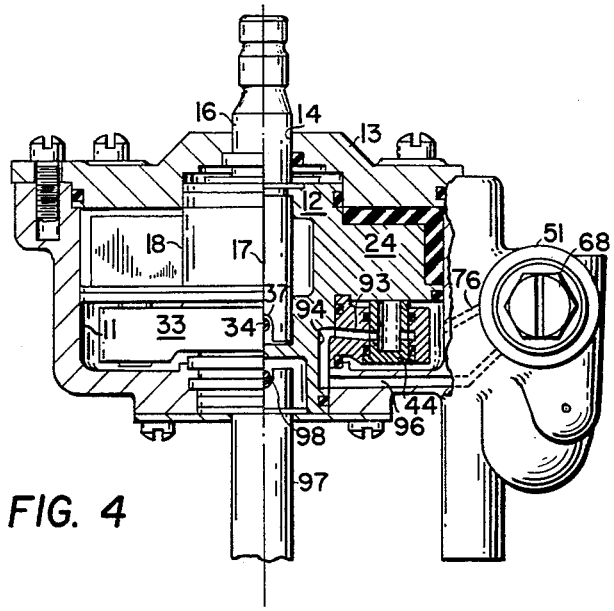
Figure 4 is a view partially in section taken along 4—4 of Figure 3.

The hub 18 of the rotor 12 extends through the cross plate 31 into the zone 31b and has mounted thereon a control valve housing 33 which is connected by a drive pin 34 to the signal input member 16. The drive pin extends with a close fit through the control valve housing 33, a loose bore 36 formed in the rotor 12 and into a close-fitting bore 37 formed in the input member 16. Therefore, the control valve housing 33 is rotationally fixed relative to the input member 16 and both are free for slight rotation relative to the rotor 12, due to the clearance between the bore 36 and the drive pin 34. The cross plate 31 is formed with four ports 38, 39, 41, and 42 extending therethrough, which connect the compartments 26, 27, 28, and 29 respectively with the valve zone 31b. The ports open into their respective compartments immediately adjacent to the vanes 24 as shown in Figure 1. A pair of cup shaped valves 43 and 44 are carried by the control valve housing 33 with the open ends of the valves engaging the underside of the cross plate 31 as best shown in Figure 4. The valve 43 operates in conjunction with the ports 38 and 39 and the valve 44 operates in conjunction with the ports 41 and 42. When the valves 43 and 44 and the valve housing 33 are properly oriented relative to the rotor 12 the open end face of said valve covers the associated ports.

Since the structures of the valves 43 and 44 are similar only the operation of the valve 43 will be discussed in detail with the understanding that the discussion applies equally to the valve 44. As shown in Figure 7a the face of the valve 43 overlays the ports 38 and 39 and both of the ports 38 and 39 are closed. If, however, the control valve housing 33 is rotated slightly relative to the rotor 12 in a clockwise direction as viewed in Figure 5 to move the valve 43 to the position shown in Figure 7b, the port 39 is uncovered and the port 38 is open to the inside chamber or bore 46 of the valve 43. The valve housing is arranged in a manner described below so that the bore 46 is connected to the reservoir return and the zone around the valve housing 33 is connected to a source of pressure fluid. When the valve 43 is in the position shown in Figure 7b the port 39 is open to a source of pressure fluid and the port 38 is connected to the reservoir return. Therefore, fluid under pressure is admitted to the associated compartment 27, and the compartment 26 is connected to the reservoir return. At the same time due to the similar construction of the valve 44 the port 42 is connected to the bore 46 of the valve 44 and the port 41 is connected to the zone around the valve housing 33. Therefore, fluid under pressure will be supplied to the compartment 28 and the compartment 29 will be connected to the reservoir return. This fluid connection will cause rotation of the rotor 12 in a counter-clockwise direction as viewed in Figure 1. In order to obtain clockwise rotation of the valve housing 33 as viewed in Figure 5 it is necessary to rotate the input member 16 in a counter-clockwise direction as viewed in Figure 1. Therefore, rotation of the input member 16 in a counter-clockwise direction operates the valves 43 and 44 to produce a counter-clockwise rotation of the rotor 12. Conversely if the input member 16 is rotated in a clockwise direction the opposite fluid connections will be provided and the rotor 12 will rotate in the clockwise direction. The clearance provided by the bore 36 for the locking pin 34 is arranged to permit sufficient relative rotation between the valve housing 33 and the rotor 12 to open the valve in either direction from the neutral position. This relative rotation need be only in the order of a few degrees.

If the input member 16 is rotated in a clockwise direction a sufficient amount to open the valves 43 and 44 the rotor 12 will rotate in a clockwise direction. If the open position of the valves are maintained by continuing to rotate the input member 16 rotation of the rotor 12 will continue. However, when the input member 16 ceases to rotate the rotor 12 will continue to rotate until the valves assume the off or neutral position shown in Figure 7a, at which time the rotor comes to rest. Therefore, the amount of rotary motion is equal to the amount of rotation of the input member 16.

Figure 2:
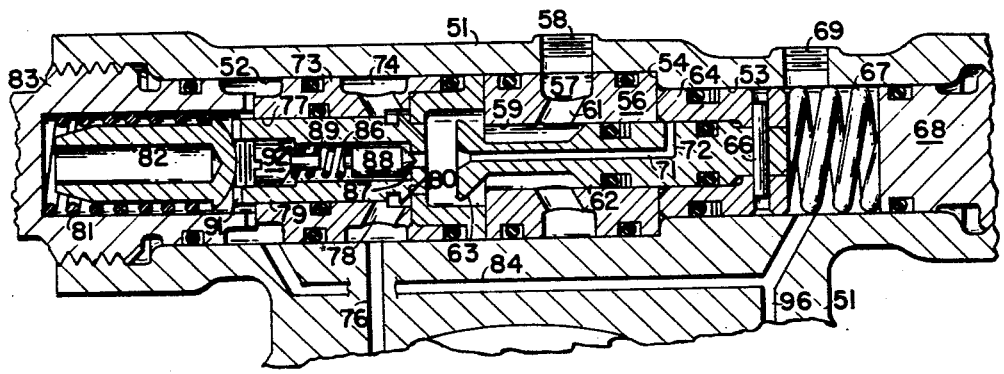
Figure 2 is an enlarged fragmentary longitudinal section of the valve mechanism which controls the pressures applied to the fluid motor.
Figure 3:
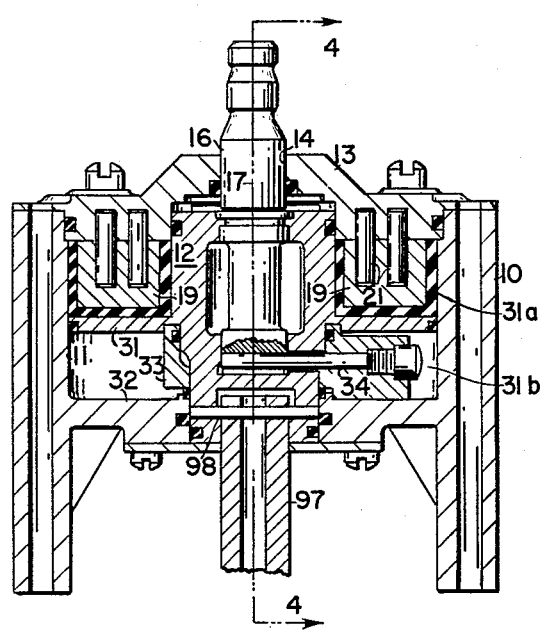
Figure 3 is a side elevation in longitudinal section of the fluid motor and control valve therefor.

In order to provide correct fluid pressure to the fluid motor a pressure control mechanism shown in Figure 2 is utilized. This mechanism is located within a laterally extending boss 51 formed on the housing 10. The boss 51 is formed with a first bore 52 and a second coaxial smaller bore 53 connected at their adjacent ends by a shoulder 54. A differential pressure valve housing 56 is positioned within the bore 52 against the shoulder 54 and is formed with an external annular groove 57 in communication with an inlet port 58 formed in the boss 51. The inlet port 58 is threaded to be connected by any suitable means to a source of fluid under pressure which in this case is the fuel pump 60 of the aircraft. The valve housing 56 is formed with a central bore 59 in communication with the external groove 57 through a plurality of symmetrically arranged substantially radial passages 61. Positioned within the bore 59 is a differential poppet valve 62 formed with a head portion 63 adapted to seat against the adjacent edge of the bore 59 to control flow into the device. The opposite end of the poppet valve 62 closely fits the bore 59 and extends into a piston head 64 connected thereto by a cross pin 66. The piston head 64 is positioned within the bore 53 and is urged into engagement with the end of the valve housing 56 by a spring 67 which is in turn held in position by an end plug 68. The boss 51 is formed with an outlet port 69 threaded for connection to a reservoir return or exhaust system which in the preferred installation would be connected to the fuel storage or reservoir tanks 65 in the aircraft. The poppet valve 62 is formed with a central passage 71 open to the face of the head portion 63 at one end and a radial passage 72 at its other end. These two passages cooperate to provide communication between the left end of the poppet valve 62 and the zone between the piston head 64 and the right end of the differential valve housing 56.

The assembly which includes the poppet valve 62 and the piston head 64 therefor is exposed on its left faces to the pressure of the fluid contained to the left or downstream side of the head portion 63, and on its right end faces to the return pressure. The two effective areas under these pressures are substantially equal and opposed so that a fluid pressure force is developed urging the poppet valve 62 to the right which is a function of the pressure of the fluid on the downstream side of the head portion 63 and a second opposed force is developed by the pressure within the reservoir return circuit which is again a function of that pressure. The spring 67 assists the reservoir return pressure in urging the poppet valve 62 to the left toward the open position and maintains the valve in this open position until the difference in pressure between the reservoir return and the left or downstream side of the head portion 63 reaches a predetermined value determined on the force of the spring 67. If the pressure acting on the left surfaces is greater than the predetermined pressure the poppet valve 62 moves to the right and limits the flow into the mechanism from the inlet port 58. This valve, therefore, operates as a differential pressure valve and prevents excessive differential pressures from occurring within the fluid motor. It therefore maintains a maximum inlet pressure to outlet pressure relationship for the device and prevents destructive pressures or forces from being developed in the system.

To the left of the differential valve 62 is an under pressure and over pressure valve mechanism contained within a second housing assembly 73 positioned in the bore 52 against the left end of the differential pressure valve housing. This second housing assembly 73 is formed with an external annular groove 74 open to an inlet passage 76 formed in the housing 10. The passage 76 communicates with the zone around the control valve housing 33 as shown in Figure 4. The second housing assembly 73 is formed with a central bore 77 connected to the external groove 74 by symmetrically arranged passages 78. Positioned within the bore 77 is an under pressure slide valve 79 which engages a valve seat 80 when in the position shown in Figure 2. The slide valve 79 is urged to the right by a spring 81 engaging a spring follower 82 which in turn engages the left end of the slide valve 79. The spring 81 is held in place by an adjustable plug 83 threaded into the end of the bore 52. The left end of the slide valve 79 and the zone in which the spring 81 is located are referenced to the reservoir return pressure by a passage 84 formed in the housing 10 so that the left end of the slide valve 79 is always maintained at reservoir return pressure. Since the right end of the slide valve 79 is subjected to the pressure of the inlet port 58 unless the differential poppet valve 62 is operating to reduce the inlet pressure, the resulting fluid force will act upon the slide valve 79 to urge it to the left and overcoming this spring 81. The slide valve 79 operates to prevent flow to the fluid motor if the pressure is below a predetermined minimum pressure. This insures that the fuel line pressure to the aircraft engine is above the required minimum pressure before the fuel is supplied thereto by the servo fluid motor.

If the fluid motor is not being operated and the pressure of the inlet port 58 is large enough to move the differential poppet valve 62 to the closed position, any leakage which passes the portion 63 will tend to build up excessive pressures within the fluid motor mechanism. To prevent damage from such build-ups a relief mechanism is located within the slide valve 79. The slide valve 79 is formed with a central bore 86 terminating in a valve seat 87 against which a relief valve 88 is seated by a spring 89. The spring in turn engages a spring seat member 92 threaded into the left end of the bore 86. The spring seat member 92 is provided with relief grooves 91 so that the left end of the relief valve 88 is in communication with the zone to the left end of the slide valve 79 and in turn the reservoir return port 69. If the pressure downstream from the differential poppet valve 62 exceeds a predetermined maximum due to leakage or other causes, the relief valve 88 will be moved to the left by this pressure against the force of the spring 89 to bleed off fluid and reduce the pressure. The relief valve operating pressure should be higher than the regulating pressure of the valve 62.

Those skilled in the art will recognize that these various valves co-operate to insure that only the proper pressures will be present within the fluid motor. The differential valve 62 maintains a maximum predetermined differential pressure supply to the fluid motor when the motor is operating. In other words it operates as a pressure regulator to insure that excessive pressure will not be applied to the fluid motor. The slide valve 79 operates to insure that unless the pressure of the fluid supplied to the motor is greater than a predetermined minimum pressure, the motor will not operate and the relief valve 88 functions to protect the equipment when it is not operating against any leakage which by-passes the differential valve 62.

The bores 46 of the valves 43 and 44 are connected through radial ports 90 (shown in Figure 5) formed in the valves 43 and 44 to a cross-bore 93 formed in the control valve housing 33. The passage 93 connects to the recess 94 (shown in Figures 4 and 5) formed in the rotor 12 which, in turn, opens to a return passage 96 formed in the housing 10. The return passage connects to the passage 84 to complete the return circuit. Suitable seals are provided throughout to isolate the various zones.

In operation, fluid under pressure is supplied to the inlet port 58 and through the valves contained within the bore 52 to the inlet passage 76. When the input member 16 is rotated relative to the rotor 12 the fluid under pressure is supplied to the proper compartments 26 and 29 or 27 and 28 and the other compartments are connected to the reservoir return. This produces rotation in the same direction as the rotation of the input member 16. When the input member 16 stops, the rotor continues to move until the valves 43 and 44 isolate the compartments 26 through 29 from the inlet pressure and reservoir return. Vibrations will not cause the rotor 12 to move out of proper position because any tendency for the rotor 12 to move in response to vibration loads will automatically open the valves 43 and 46 and bring the rotor back to the proper position. The load controlled by the fluid motor is coupled to rotor 12 by an output member 97 and a cross pin 98. If the device according to this invention is to be used to control the throttles of an aircraft engine the engine throttles are connected to the output member 97. If any other mechanism is to be controlled, of course, such other mechanism would be connected to the output member 97.

Although the preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

We claim:

1. A servo-fluid motor system comprising a housing formed with a bore, a rotor journaled for rotation about an axis in said bore formed with a cross wall dividing said bore into a motor chamber and a valve chamber, fixed vanes on said housing and vanes on said rotor co-operating within said motor chamber to divide it into a plurality of compartments the volumes of which are changed by rotation of said rotor, a port through said wall associated with each compartment, control valve means journaled in said valve chamber for rotation around said axis, said control valve means being connected to a source of pressure fluid and a reservoir return and co-operating with said ports to supply fluid pressure to said motor upon control valve rotation and cause pressure induced motion of said rotor in the same direction and through the same angle as the rotation of said control valve means, and pressure responsive valve means connecting said control valve means to a source of pressure fluid and a reservoir return; the pressure responsive valve means including a first valve preventing the inlet pressure applied to said motor from exceeding the return pressure by a predetermined operating pressure when said motor is operating, a second valve preventing flow to said motor when the inlet pressure exceeds the return pressure by less than a predetermined minimum value, a third valve preventing excessive pressures from being applied to said motor when it is not operating.

2. In combination a fluid motor including two elements movable relative to each other under the influence of fluid under pressure, a control valve connected to said motor controlling the direction and rate of said relative movement, a source of fluid under pressure, first and second pressure sensitive valves connected in series between said source and control valve controlling the pressure of fluid supplied to said control valve from said source, said first valve being normally closed isolating said source and control valve and operable to open permitting communication therebetween when the pressure of said source exceeds a predetermined minimum pressure, said second valve being normally open having an outlet through which fluid flows from said source to said control valve providing said first valve is opened and operable to close, isolating said control valve from said source when the pressure of fluid supplied to said control valve exceeds a predetermined operating pressure greater than said minimum pressure.

3. In combination a fluid motor including two elements movable relative to each other under the influence of fluid under pressure, a control valve connected to said motor controlling the direction and rate of said relative movement, a source of fluid under pressure, a reservoir return, first and second pressure sensitive valves connected in series between said source and control valve controlling the pressure of fluid supplied to said control valve from said source, said first valve being normally closed isolating said source and control valve and operable to open permitting communication therebetween when the pressure of said source exceeds, a pre-determined minimum pressure, said second valve being normally open and having an outlet through which fluid flows from said source to said control valve providing said first valve is open and operable to close isolating said control valve from said source when the pressure supplied to said control valve exceeds a pre-determined operating pressure greater than said minimum pressure, and a normally closed pressure relief valve connected between said outlet and said reservoir operable to provide communication therebetween when the pressure in said outlet exceeds a pre-determined maximum pressure greater than said operating pressure.

4. In combination a fluid motor including two elements movable relative to each other under the influence of fluid under pressure, a control valve connected to said motor controlling the direction and rate of said relative movement, a source of fluid under pressure, a reservoir return, first and second pressure sensitive valves connected in series between said source and control valve controlling the pressure of fluid supplied to said control valve from said source, said first valve being normally closed isolating said source and control valve and operable to open permitting communication therebetween when the pressure of said source exceeds the pressure of said reservoir by a pre-determined minimum pressure, said second valve being normally open and having an outlet through which fluid flows from said source to said control valve providing said first valve is opened and operable to close isolating said control valve from said source when the pressure of fluid supplied to said control valve exceeds the pressure of said reservoir by a pre-determined operating pressure greater than said minimum pressure, and a normally closed pressure relief valve connected between said outlet and said reservoir operable to provide communication therebetween when the pressure in said outlet exceeds the pressure of said reservoir by a pre-determined maximum pressure greater than said operating pressure.

5. In combination a fluid motor including two elements movable relative to each other under the influence of fluid under pressure, a source of fluid under pressure, a reservoir return, a control valve connected to said motor contolling the rate and direction of said relative movement, a differential pressure valve having an inlet through which fluid from said source flows and an outlet through which fluid may flow to said control valve and motor, said differential valve including a member movable between a closed position in which it isolates said inlet from said outlet and an open position in which it effects communication between said inlet and outlet, said member being formed with opposed surfaces the first of which is acted on by the pressure in said reservoir return and the second of which is acted on by the pressure in said differentail pressure valve outlet, the pressure acting on said first surface producing a force urging said member toward said open position and the pressure acting on said second surface producing the force urging said member toward said closed position, a spring applying a force to said member urging it toward said open position whereby said differential valve closes only when the pressure in its outlet exceeds the pressure in said reservoir return by a pre-determined operating pressure, a minimum pressure valve having an inlet through which fluid from said source flows and an outlet through which fluid flows to said control valve and motor, said under pressure valve including a poppet movable between a closed position wherein said source is isolated from said motor and an open position in which it permits fluid communication between said source and motor providing said member is in said open position, said poppet being formed with opposed faces the first of which is acted on by the pressure in the inlet of said under pressure valve and the second of which is acted on by the pressure in said reservoir return, the pressure acting on said first face producing a force urging said poppet toward said open position and the pressure acting on said second face producing a force urging said poppet toward said closed position, resilient means urging said poppet toward said closed position whereby said minimum pressure valve is closed when the pressure of fluid in its inlet exceeds the pressure of fluid in said reservoir return by less than a predetermined minimum pressure less than said pre-determined operating pressure.

6. In combination a fluid motor including two elements movable relative to each other under the influence of fluid under pressure, a source of fluid under pressure, a reservoir return, a control valve connected to said motor contolling the rate and direction of said relative movement, a differential pressure valve having an inlet through which fluid from said source flows and an outlet through which fluid may flow to said control valve and motor, said differential valve including a member movable between a closed position in which it isolates said inlet from said outlet and an open position in which it effects communication between said inlet and outlet, said member being formed with opposed surfaces the first of which is acted on by the pressure in said reservoir return and the second of which is acted on by the pressure in said differential pressure valve outlet, the pressure acting on said first surface producing a force urging said member toward said open position and the pressure acting on said second surface producing the force urging said member toward said closed position, a spring applying a force to said member urging it toward said open position whereby said differential valve closes only when the pressure in its outlet exceeds the pressure in said reservoir return by a pre-determined operating pressure, a minimum pressure valve having an inlet through which fluid from said source flows and an outlet through which fluid flows to said control valve and motor, said minimum pressure valve including a poppet movable between a closed position wherein said source is isolated from said motor and an open position in which it permits fluid communication between said source and motor providing said member is in said open position, said poppet being formed with opposed faces the first of which is acted on by the pressure in the inlet of said minimum pressure valve and the second of which is acted on by the pressure in said reservoir return, the pressure acting on said first face producing a force urging said poppet toward said open position and the pressure acting on said second face producing a force urging said poppet toward said closed position, resilient means urging said poppet toward said closed position whereby said minimum pressure valve is closed when the pressure of fluid in its inlet exceeds the pressure of fluid in said reservoir return by less than a pre-determined minimum pressure less than said pre-determined operating pressure, and relief valve normally isolating said reservoir return and the outlet of said differential valve operable to provide communication therebetween when the pressure in said differential valve outlet exceeds the pressure in said reservoir by a pre-determined maximum pressure.

7. In combination a fluid motor including two elements movable relative to each other under the influence of fluid under pressure, a source of fluid under pressure, a reservoir return, a control valve connected to said motor contolling the rate and direction of said relative movement, a differential pressure valve having an inlet through which fluid from said source flows and an outlet, said differential valve including a member movable between a closed position and an open position, said member being formed with opposed surfaces the first of which is acted on by the pressure in said reservoir return and the second of which is acted on by the pressure in said outlet, the pressure acting on said first surface producing a force urging said member toward said open position and the pressure acting on said second surface producing the force urging said member toward said closed position, a spring applying a force to said member urging it toward said open position whereby said differential valve closes only when the pressure in its outlet exceeds the pressure in said reservoir return by a pre-determined operating pressure, a minimum pressure valve having an inlet connected to said outlet and a discharge connected to said control valve, said minimum pressure valve including a poppet movable between a closed position and an open position, said poppet being formed with opposed faces the first of which is acted on by the pressure in the inlet of said under pressure valve and the second of which is acted on by the pressure in said reservoir return, the pressure acting on said first face producing a force urging said poppet toward said open position and the pressure acting on said second face producing a force urging said poppet toward said closed position, resilient means urging said poppet toward said closed position whereby said minimum pressure valve is closed when the pressure of fluid in its inlet exceeds the pressure of fluid in said reservoir return by less than a pre-determined minimum pressure, a relief valve normally isolating said reservoir return and the outlet operable to provide communication therebetween when the pressure in said outlet exceeds said pressure in said reservoir by a pre-determined maximum pressure.

References Cited in the file of this patent

UNITED STATES PATENTS

| | | |
|---|---|---|
| 1,655,173 | Webber | Jan. 3, 1928 |
| 1,967,981 | Thomas | July 24, 1934 |
| 2,043,453 | Vickers | June 9, 1936 |
| 2,167,328 | Beggs | July 25, 1939 |
| 2,232,038 | Stone et al. | Feb. 18, 1941 |
| 2,372,710 | Chisholm | Apr. 3, 1945 |
| 2,550,529 | Carson et al. | Apr. 24, 1951 |